(12) United States Patent
Hecht, Jr. et al.

(10) Patent No.: US 8,027,928 B1
(45) Date of Patent: Sep. 27, 2011

(54) DYNAMIC SELECTION OF DEPOSIT CLEARING METHODS BASED ON BUSINESS RULES

(75) Inventors: Alan W. Hecht, Jr., Chanhassen, MN (US); Laura Lee Orcutt, Chanhassen, MN (US); Jeffrey Allen Harmon, River Falls, WI (US); Michelle Marie Young, Pasadena, CA (US); Stephanie A. Sturgis-Griffin, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 116 days.

(21) Appl. No.: 12/118,341

(22) Filed: May 9, 2008

Related U.S. Application Data (63) Continuation-in-part of application No. 10/699,552, filed on Oct. 30, 2003, now Pat. No. 7,660,771.

(51) Int. Cl.
*G06Q 20/00* (2006.01)
(52) U.S. Cl. .................... 705/64; 705/67; 705/1
(58) Field of Classification Search .......... 705/64, 705/67, 1
See application file for complete search history.

(56) References Cited

U.S. PATENT DOCUMENTS

| | | | |
|---|---|---|---|
| 5,053,607 A | 10/1991 | Carlson |
| 5,175,682 A | 12/1992 | Higashiyama |
| 5,195,133 A | 3/1993 | Kapp |
| 5,297,202 A | 3/1994 | Kapp |
| 5,326,959 A | 7/1994 | Perazza |
| 5,412,190 A | 5/1995 | Josephson |
| 5,465,206 A | 11/1995 | Hilt |
| 5,484,988 A | 1/1996 | Hills |
| 5,532,464 A | 7/1996 | Josephson |
| 5,691,524 A | 11/1997 | Josephson |
| 5,783,808 A | 7/1998 | Josephson |
| 5,832,463 A * | 11/1998 | Funk ............................ 705/35 |
| 5,848,400 A | 12/1998 | Chang |
| 5,893,080 A | 4/1999 | McMurl |
| 5,920,847 A | 7/1999 | Kolling |
| 6,032,133 A | 2/2000 | Hilt |
| 6,070,150 A | 5/2000 | Remington |
| 6,164,528 A | 12/2000 | Hills |
| 6,170,744 B1 | 1/2001 | Lee |
| 6,189,785 B1 | 2/2001 | Lowery |
| 6,223,168 B1 | 4/2001 | McGurl |
| 6,243,689 B1 | 6/2001 | Norton |

(Continued)

FOREIGN PATENT DOCUMENTS

EP  4 94796  4/1998

(Continued)

OTHER PUBLICATIONS

"Saga Automated Clearing House Solution;" updated Apr. 4, 2006; <http://lasershowproduction.com/english/business/multikanalni_sistemi/clearing.htm>; 2 pages.

(Continued)

*Primary Examiner* — Pierre E Elisca
(74) *Attorney, Agent, or Firm* — Merchant & Gould P.C.

(57) ABSTRACT

In general, this disclosure describes techniques of dynamically selecting deposit clearing methods based on business rules. As described in this disclosure, a financial institution receives checks drawn on other financial institutions as customer deposits. When the financial institution receives a check, the financial institution automatically applies one or more customizable business rules to identify a method to clear the check. The financial institution then uses the identified method to clear the check.

17 Claims, 4 Drawing Sheets

U.S. PATENT DOCUMENTS

| | | | |
|---|---|---|---|
| 6,283,366 B1 | 9/2001 | Hills | |
| 6,301,379 B1 | 10/2001 | Thompson | |
| 6,354,491 B2 | 3/2002 | Nichols | |
| 6,408,284 B1 | 6/2002 | Hilt | |
| 6,654,487 B1 * | 11/2003 | Downs, Jr. | 382/139 |
| 6,754,640 B2 | 6/2004 | Boseman | |
| 7,020,639 B1 | 3/2006 | Slater | |
| 7,636,690 B2 * | 12/2009 | Swift et al. | 705/45 |
| 2002/0178112 A1 * | 11/2002 | Goeller et al. | 705/39 |
| 2003/0023555 A1 | 1/2003 | Rees | |
| 2003/0182227 A1 * | 9/2003 | Guzman | 705/39 |
| 2004/0148235 A1 | 7/2004 | Craig | |
| 2005/0091132 A1 | 4/2005 | Phillips | |
| 2005/0097050 A1 | 5/2005 | Orcutt | |

FOREIGN PATENT DOCUMENTS

| | | |
|---|---|---|
| EP | 9 84410 | 3/2000 |
| EP | 1 096 437 | 4/2001 |
| JP | 409178443 A | 7/1997 |

OTHER PUBLICATIONS

Curley, B., Bank Systems + Technology; *First Union Division Offers Check Processing at POS*; May 1999.

David, Rick; "Check 21—The Check Clearing for the 21st Century Act;" accessed Dec. 5, 2007; 3 pages.

Foster, C., 1st European Financial Industry Technology Conference; *Electronic Dealer Drafting—A Practical Application of EDI*; 1989.

IEEE; "A rule based expert system for check routing and cash letter management;" © 2007; 1 page.

Kendler, Peggy Bresnick; "Clearing and Settlement;" Bank Systems & Technology; Sep. 27, 2004; 4 pages.

NCR Corporation; "NCR Poised to Support Merchant Reduction of Check-Clearing Costs, In Step with New Back-Office Conversion Ruling;" May 10, 2007; 2 pages.

Weiner, S., *Electronic Payments in the U.S. Economy: An Overview*; 1999.

* cited by examiner

DYNAMIC SELECTION OF DEPOSIT CLEARING METHODS BASED ON BUSINESS RULES

This application is a continuation-in-part of U.S. patent application Ser. No. 10/699,552, filed Oct. 30, 2003, the entire content of which is hereby incorporated by reference.

BACKGROUND

Financial institutions receive millions of checks every day. In general, a check is a legal instrument that authorizes a financial institution to withdraw an amount of money from an account of a drafter of the check and deposit the amount of money in an account of the recipient of the check. Example checks include personal checks, money orders, cashier's checks, business checks, traveler's checks, government checks, and so on.

When a financial institution receives a check, the financial institution clears the check. In general, clearing a check means withdrawing an amount of money from an account of a drafter of the check and depositing the amount of money in an account of the recipient of the check.

There are several methods by which a financial institution can clear a check. For instance, a financial institution can clear a check using electronic check image exchange services (such as SVPCO, Viewpointe, FedForward from Federal Reserve Financial Services, Endpoint Exchange, Direct Connect to a financial institution, etc.), automated clearing house (ACH) transactions, image replacement document (IRD) prints, a physical paper exchange method, and other methods. Each of the methods has its advantages and disadvantages. For example, checks received after a particular time of day will not be cleared using the ACH method until a next day, while checks received after that time of day may still be cleared using an electronic check image exchange method. However, in this example, the paper exchange method may be more costly because the paper exchange method requires the physical transportation of the check from the financial institution to another financial institution, whereas the ACH method does not.

Typically, a financial institution determines which clearing method to use for a check based on a type of transaction channel through which the financial institution received the check. For example, a financial institution may use the ACH method to clear checks that the financial institution receives through Automated Teller Machines (ATMs) and may use the electronic check image exchange method to clear checks that the financial institution receives through human tellers at local bank branches.

SUMMARY

In general, this disclosure describes techniques of dynamically selecting deposit clearing methods based on business rules. As described in this disclosure, a financial institution receives checks drawn on other financial institutions. When the financial institution receives a check, the financial institution automatically applies one or more business rules to identify a method to clear the check. The financial institution then uses the identified method to clear the check.

These techniques may enable the financial institution and customers of the financial institution to intelligently exploit the relative advantages of the different methods of clearing checks. By customizing the business rules, the financial institution can dynamically adjust which clearing method to use to clear checks based on a wide variety of factors other than the transaction channels through which the financial institution received the checks. As a result, the techniques of this disclosure may enable the financial institution to operate more efficiently and may save time and money for customers of the financial institution.

The techniques of this disclosure may be implemented in several ways. For example, the techniques of this disclosure may be implemented as a method that comprises receiving a check from a customer through a transaction channel. The method also comprises applying a set of business rules to identify a method of clearing the check from a plurality of available methods of clearing the check. In addition, the method comprises using the identified method to clear the check.

The techniques of this disclosure may also be implemented as a system that comprises a plurality of deposit transaction channels that receive checks from customers of a financial institution. The system also comprises a plurality of pockets, each of which is associated with a different method of clearing checks. In addition, the system comprises a sorting device that identifies, for each check received by the deposit transaction channels, a method of clearing the check by applying a customizable set of business rules and that sorts the check into one of the pockets that is associated with the identified method of clearing the check.

In addition, the techniques of this disclosure may be implemented as a computer-readable medium comprising instructions that cause a device that executes the instructions to receive, at a financial institution, a check from a customer through a transaction channel. In addition, the instructions cause the device to apply a customizable set of business rules to identify a method of clearing the check from a plurality of available methods of clearing the check. Furthermore, the instructions cause the device to sort the check into a pocket associated with the identified method of clearing the check.

The details of one or more techniques are set forth in the accompanying drawings and the description below. Other features, objects, and advantages of these techniques will be apparent from the description, drawings, and claims.

DETAILED DESCRIPTION

A technique is provided for automatically converting checks to automated clearing house (ACH) debits. The process is a two-part process in which the Magnetic Ink Character Recognition (MICR) line in a check is read at the point the check is presented and a decision is made if the check can be converted to an ACH debit. The decision is made by applying various rules. If the system is unable to convert the check to an ACH debit, then the check is processed as a normal check. If a decision is made that the check can be processed as an ACH debit, then the MICR line is parsed for the financial institution which issues the check to create the ACH debit. As used in this disclosure, the terms "truncate" and "convert," and their various forms are used herein interchangeably.

The following discussion describes one example technique of converting checks to ACH debits. In accordance with this example technique, customers (e.g., merchants, vendors, etc.) receive checks and other paper payment documents over the counter at retail point of sale (POS) or at a centralized lockbox location, deposit them, and wait up to 10 days for notification of returned items.

POS is a widely decentralized environment. Checks accepted at a POS are usually subject to verification or guarantee by check services providers. These check services providers verify only the likelihood that sufficient funds are in the account to cover the check at the time it is accepted at the POS. Other ineligible items including money orders, traveler's checks, etc. are typically deposited rather than truncated.

Retail lockbox is currently a two-pass environment. Checks and other paper payments, each accompanied by a payment coupon, come into the lockbox and are run through high-speed sorting equipment. On the first pass, the mail is opened and information is captured from the check and coupon. On the second pass, checks are power encoded to create a cash letter for deposit. Lockbox customers typically rush to meet deposit deadlines at their local depository financial institutions.

The system provides conversion solutions designed for use with an RCK conversion application, a POS conversion application, and an ARC conversion application.

RCK. Electronic check re-presentment (RCK) deals with converting consumer checks that have been returned for nonsufficient funds (NSF) or uncollected funds into ACH debits. Acting as the customer's ACH Originating Depository Financial Institution (ODFI), and according to a preferred embodiment of the system, the financial institution receives the returns and applies conversion logic to truncate them into ACH debits. The system provides check truncation decision processing methodology, which provides updating with administrative return information allowing customers to collect payments successfully.

POS. Ten billion to 20 billion checks are written at point of sale annually. In accordance with the system, in the POS application, conversion logic is applied when a check is presented for payment. At the retail location, the cashier scans the check then calls for authorization. The check truncation decision processing logic resides on equipment at a centralized location rather than in the retail store. The cashier receives confirmation that the item can be converted to an ACH debit or, if it cannot, it must be deposited.

ARC or Lockbox. Approximately the same number of checks are mailed to lockboxes, or placed in drop-boxes, as are written at point of sale. However, in these situations, high volumes of checks are concentrated in one location. Check truncation decision processing logic is applied to identify ineligible items at two points in lockbox processing: 1) the mail opening process where non-standard checks as well as money orders, traveler's checks, and the like are identified and separated, and 2) at a first pass through data capture equipment control point when ineligible items should be pocketed as deposit vs. truncated items.

Mail opening equipment uses basic Yes/No logic to detect inconsistencies in check sizes and in MICR lines lengths. Mail opening equipment does not look at R/T numbers or MICR line detail. To enable customers to identify items ineligible for ACH truncation, the system provides software upgrades to make mail opening equipment smarter by outsorting ineligible items. Then, check truncation decision processing is applied, such processing methodology developed and maintained by electronic check experts or expert system, for use in the information capture process to identify any ineligible items that are not caught in the mail sort. The processing information, which is programmed into the software that runs the equipment, is driven by a particular consumer's billing account number as well as the R/T number and account number from the check.

The check truncation decision processing methodology also provides the logic for parsing routines needed to correctly obtain the appropriate routing and transit number, account number, and check serial number information needed to create a successful ACH transaction.

Just as antivirus software is updated continuously to identify and halt newly invented computer viruses, check truncation decision processing system is updated continuously to identify and convert new exception items. To provide customers with such ongoing maintenance, the system provides automated interfaces that notify and update customer platforms for new items as they appear. Maintenance takes place on three levels. From highest to lowest, these levels are: a Routing/Transit (R/T) Number level (i.e., an Institutional Level), a Routing/Transit Number and Account Number level, and a Consumer Billing ID level (i.e., a Consumer Level).

As customers encounter a new occurrence, the system provides for taking the return item, examining the image, and determining what changes should preferably be made to re-originate the ACH transaction successfully. Thus, the burden of manual administrative return processing is off the hands of customers and any changes needed to be successful converting checks going forward are stored.

Remittance Processing with Check Conversion

Paper checks received from consumers in payment of an account receivable, such as a credit card account, are converted to an electronic debit. The paper check is imaged and destroyed. The consumer sees detailed payment information on his or her bank statement.

Check Conversion Process

Figure 1:
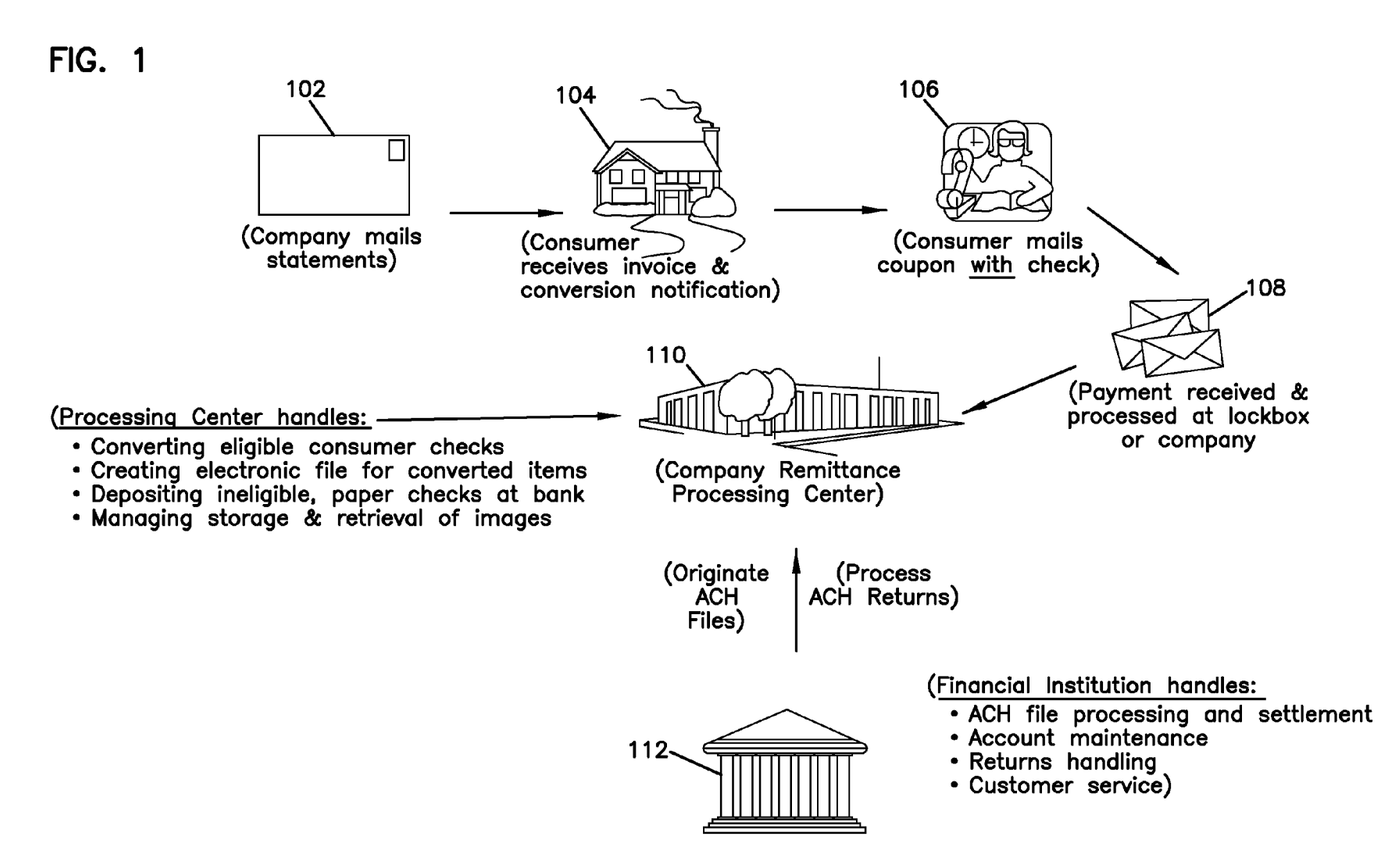
FIG. 1 is a schematic diagram showing an example flow of an example express check conversion process.

FIG. 1 is a schematic diagram showing an example flow of the express check conversion process. In one embodiment of the system, a company mails a statement to a consumer (102). The consumer receives the invoice and conversion notification (104). The consumer mails a coupon with a corresponding check, on route to a remittance processing center (106). The remittance processing center delivers the consumer mail to the company or to a lockbox associated with the company, where payments are received and processed (108). Then, the received and processed payments are sent to the company remittance processing center (110). The company remittance processing center handles the following functionality: converting eligible consumer checks, creating electronic file for converted items, depositing ineligible paper checks at bank, and managing storage and retrieval of images.

The associated financial institution 112 handles the following: ACH file processing and settlement, account maintenance, returns handling, and customer service.

It should be appreciated that the company remittance site opening mail and processing payments for the company may be located at the company itself or at third party site. Regardless, the company can decide with which financial institution it wants to deposit ineligible items. Such financial institution may be different than the ODFI. For example, while lockbox processing is done in Florida, it may be that Wells Fargo Bank is the ODFI for the ACH items. However, because Wells Fargo does not have any branches or vaults in Florida, the company can decide to deposit the ineligible items with a local Florida bank.

Remittance Processing Center

The Remittance Processing Center provides the following functionality: open envelope, image payment, determine payment amount, associate payment with customer account, and determine if check is eligible for conversion.

Eligible Items

Eligible items include: consumer checks only, checks having a pre-printed serial number, checks completed and signed by consumer, checks of any dollar value.

Ineligible items include: corporate checks, third party checks, credit card checks, cashier's checks and money orders, government checks, checks payable in a foreign currency, checks containing an auxiliary on-us field.

Sorting Criteria

Sorting criteria include: the Customer database, business customer, opt out customer, size of check (e.g., 6" denotes a consumer check, larger size usually denotes a business check), routing transit number on check, ACH acceptor or not, format of MICR line, and existence of auxiliary on-us field.

Sorting Function

Checks are sorted as follows: if a check is eligible for conversion, the check is added to a "Perfect Parsing" file, described herein below. If the check is not eligible for conversion, the check is deposited in a bank.

Impact of Sorting Decision

Inaccurate decisioning results in Administrative Returns. The RDFI (receiving bank) is not able to process the ACH debit transaction. When the RDFI is not able to process the ACH debit transaction, the RDFI returns the transaction to the ODFI (originating bank). The ODFI may then return the check to the originating party for disposition (most likely, repair and re-origination).

Sample MICR Formats

There are several MICR formats. Because there are several MICR formats, bank account information may not easily identifiable and check serial numbers may not be easily identifiable. The following are sample MICR formats:

A211371078A 88 9999999C 5847
A324377516A99999999999 3C 4195
A121101037A6622D99999999C09
A231382306A 02 9999999C16-1712
A121000248A322-9999 999999C
A322079353A 999999999C5283 10
A073901851A 999D999C10 0623
A121301028A 1234D9999C 2334

Parsing the MICR Line

The following information provides guidelines and constraints for parsing the MICR line:

The "On-Us" field of MICR line on a check contains 20 characters.

ACH account format permits only 17 characters.

MICR may include a transaction ("TT") code which may or may not be a valid field for an ACH transaction.

The placement of the account number, serial number, and transaction code in the MICR line is not standard across the banking industry.

ACH transactions may require adding or removing leading zeros in the account number.

Credit union share drafts often require R/T and account number reformatting to process as an ACH item.

MICR Parsing Options

Some options for parsing are provided as follows:

Using a provided Decisioning Table to make decisions, parse within a customer's remittance processing environment and create a NACHA formatted file; or Decision within the customer's remittance processing environment and create a "Perfect Parsing" data file and transmit to the financial institution facility for parsing via a Decisioning Table, such as an exemplary Decisioning Table described below; and Use a third party software Decisioning Table, such as U.S. Dataworks, and create a NACHA formatted file.

An Exemplary Decisioning Table

An Exemplary Decisioning Table includes the following features:

A database of bank R/T numbers and account number and MICR parsing formats.

Daily, weekly, monthly analysis of all of a financial institution's ACH origination, return, NOC transaction data, including finding patterns.

Means for Notifications of Change (NOCs) being automatically loaded and used to correct future originated transactions.

Using the Decisioning Table

Some ways for using the Decisioning Table are provided as follows:

Install the financial institution facility's database in the customer's platform and use it to determine eligible and ineligible items. Then send the resulting data file to the financial institution's facility, which then parses the data and creates and processes a NACHA formatted file containing the customer's transactions.

Install the financial institution facility's database in the customer's platform and use it to determine, eligible and ineligible items. Then, the customer sends the full MICR line, amount, and the customer reference number to the financial institution facility, which then performs enhanced modifications and corrections, such as adding or deleting leading zeros, and credit union conversion modifications, and the like, and as discussed in detail herein.

Use third party software, such as U.S. Dataworks, to convert items and send the resulting NACHA formatted file to the financial institution's facility for further processing, as described in detail herein below.

Installing Database in Customer's Platform

The following provides a way for successfully installing the decisioning table (database) in the customer's platform:

Incorporate the database into the customer's software program to assist in determining which checks are eligible for conversion.

Updating the database weekly or monthly from a transmitted file sent from the financial institution's facility to the customer.

"Perfect Parsing" File

Following is a way of creating and using the Perfect Parsing file: Capture the R/T number field, the on-us field, and determine the amount of checks eligible for conversion. Send the "Perfect Parsing" file to the financial institution without editing the transaction data. Let the financial institution parse the data. Create and process a NACHA formatted file for eligible conversion items. Create paper drafts for ineligible items. It should be appreciate that the resulting NACHA formatted file may have the lowest possible administrative return rate, because, among other things 1) the decisioning is correct; and 2) the back-end ACH formatting can be performed after the NACHA file is received.

Process Flow—Ineligibles

Following are guidelines provided for the ineligibles process flow:

Power encode the ineligibles with the given dollar amount.

Due to the lower volume of checks deposited, special sorting of checks may no longer be needed.

Depending on the mix of business/consumer checks, decide possibly to deposit the checks without encoding the dollar amount.

Deposit at bank.

Process Flow—Eligible Checks

Following are guidelines provided for the eligibles process flow:

Mark checks void on transport (optional).

Confirm that images are readable.

Transmit file to the financial institution for processing of ACH debits.

Destroy checks that have been converted to ACH debits within a predetermined number of days, e.g. 14 days, of the settlement date.

An Exemplary Express Check Conversion Embodiment

In a bank's directory the following is provided. The preferred table identifies: active versus retired R/T numbers, ACH participating R/T numbers, credit union conversion identification and translation information, check conversion eligibility flags, invalid account lengths, minimum and maximum account lengths, parsing format codes, and trim lead zero indicator.

MICR Translation Table. The table contains a list of masks for all of the possible MICR on-us field variations with the corresponding location of the account number and check serial number. Some masks are duplicated on the table with parsing format identifiers that match options available on the Bank Directory.

Transaction Management Database. This table stores all originated check conversion transactions and corresponding transaction modifications needed for future transactions. The transaction modifications are a result of received notifications of change and administration (admin) return processing.

Process Flow

The financial institution facilitator provides initial and on-going files of ineligible R/T numbers to customers.

Customers utilize an ineligible R/T numbers list to sort checks into eligible and ineligible items. Ineligible items are encoded and deposited as checks. Due to the NACHA Rules, the customer also must identify checks containing an auxiliary on-us field as ineligible items.

For eligible items, customers format a Perfect Parsing file containing a record for each check. The file format consists of 9 byte R/T number, 20 byte MICR on-us field (including all spaces, dashes, and symbols), 10 byte dollar amount, and 22 byte client reference number.

The financial institution processes the Perfect Parsing file and creates a NACHA file of transactions for origination. Each record in the Perfect Parsing file is matched to a mask on the MICR Translation Table to identify the correct location of the account number and check serial number used for the NACHA formatted file. The parsing format for each R/T number located on the Bank Directory is also used to identify which mask to be used in the case of duplicate masks.

An internal processing system is benchmarked at six million items in and out of the ACH warehouse per hour, which is needed to support the high volume of check conversion activity.

In addition to the creation of the NACHA file, items are automatically drafted as needed to collect items from R/T numbers that may have changed their ACH participation status after the customer had loaded their ineligible R/T numbers list.

Generally speaking, there are two reasons drafts are created for institutions: 1) the institutions have changed their participation status; and 2) the credit union conversion logic currently reflects that the credit union doesn't accept ACH. For example, if a payable through bank processes for 100 credit unions, all the sharedrafts will have the same payable through R/T number, but a few of the credit unions may not accept ACH.

As the NACHA files are entered into the financial institution's ACH warehouse, the files are identified as either on-us items, or transit items. On-us items are distributed to the financial institution's posting application, and transit items are distributed to the ACH Operators for delivery to the appropriate receiving financial institutions.

Several times during the day, the financial institution receives returns from originated electronic check transactions. Once per day, it processes all the returns, sorting and distributing the fatal return items to customers and preparing settlement. All Notifications of Change (NOC) are loaded into a Transaction Management Database. Based on a predetermined list of return reason codes, admin returns are also sorted and distributed to a Unix-based server for ACH operation staff to repair and re-initiate corrected entries (admin return processing).

The admin return processing system allows viewing all details of the original transaction and the return, for example, by a staff or expert system. Each return is matched to the original item to allow the ability to validate the return detail information. All of the transaction information, as well as an image of the check is used to repair the item. The following abilities are provided: Correct and re-originate an ACH item, correct and draft an item, dishonor the ACH return, take a copy of the image to produce an image replacement document.

All operator repairs are loaded into a Transaction Management Database to be used for future originated transactions, thereby eliminating future admin returns.

MIS Reporting

To manage the on-going maintenance of the Bank Directory, ACH operations provides daily, weekly, and monthly reports produced which highlight origination detail and rates, return detail and rates, and admin return detail and rates, both by originating customer and by receiving financial institution.

The Bank Directory is updated with a Federal Reserve ACH participant listing and by a Thomson directory for bank name, address, and contact information.

Exemplary NOC Logic

The system uses NOCs received for Check Conversion transactions to modify the (R/T)/Account/Transaction code for future Check Conversion Transactions, discussed as follows. It should be appreciated that this NOC logic is only applied for valid NOCs received for check conversion transactions, such as any of: routing and transit number changes, account number changes, transaction code changes, and the like.

When a check conversion transaction is received from a check conversion customer, perform the following steps: Apply the existing check conversion logic for modifying the (R/T)/account/check/transaction code number; check if a matching NOC was received in the NATBCCHG database. If there is a match, use the NOC information to set the R/T, Account, and Transaction code. It should be appreciated that if the (R/T)/Account/Transaction code is modified because of a previously received NOC, write a record to the NOC FILE with "WFBDPN" in the descriptive date field to indicate the code was modified because of a previous NOC. These are not written to the final NOC file used to send out NOCs, but are used to add a record to NATBCCHG. Therefore, if a RETURN or NOC is received later for a transaction because of a previous NOC, such RETURN or NOC appears on the new relevant report.

If returns are received for a transaction in which the RT/Account/Transaction code is modified because of a previous NOC, that NOC record is deleted from NATBCCHG so that future transactions for that RT/Account are not altered.

If a check conversion transaction was not received for thirteen months for a matching RT/Account, then such transaction from NATBCCHG is removed.

It should be appreciated that reports include all customer provided transaction detail in addition to the resulting NACHA formatted transaction detail.

It should be appreciated that the "CODE" is "N/A" when the account is modified from our check conversion logic but did not create an NOC. The "CODE" is "PN" when the (R/T)/account/transaction code is modified because of a previous NOC, but a new NOC is not sent.

It should be appreciated that the system allows inquiries, updates, deletes, and adds to the NOC records in the NATBCCHG database to alter how the RT/Account/Transaction code is changed for check conversion transactions.

In addition to making ACH conversion decisions, the systems and methods described herein can be used to implement other business rules to make other decisions on the processing and clearing of checks.

Figure 2:
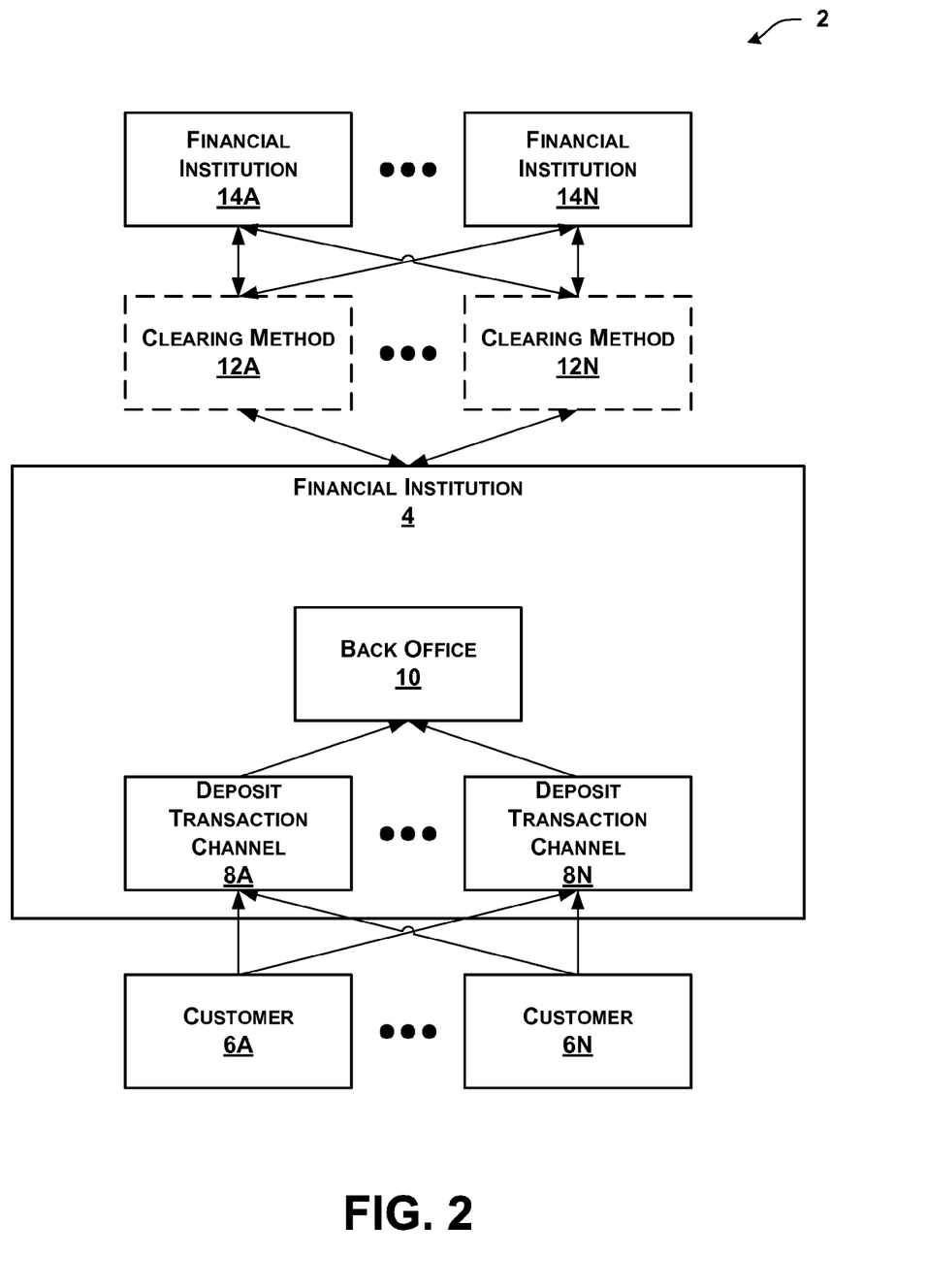
FIG. 2 is a block diagram illustrating an example system in which a financial institution applies customizable business rules to dynamically identify methods of clearing checks.

For example, referring now to FIG. 2, a block diagram illustrating an example system 2 is shown in which a financial institution 4 applies customizable business rules to dynamically identify methods of clearing checks. FIG. 2 is provided for explanatory purposes only. The techniques of this disclosure may be applied in many other contexts aside from system 2.

In the example of FIG. 2, financial institution 4 may be a wide variety of different types of financial institution. For example, financial institution 4 may be a bank, a financial services enterprise, a credit union, a mutual society, a savings and loan enterprise, a savings bank, an investment bank, or another type of financial institution.

A varying number of customers 6A-6N (collectively, "customers 6") may use financial institution 4. Customers 6 may be a wide variety of different types of entities. For example, customers 6 may be individuals, business organizations, governmental agencies, non-profit organizations, inter-governmental entities, estates, and/or other types of entities that can own or hold property.

Financial institution 4 may provide deposit transaction channels 8A-8N (collectively, "deposit transaction channels 8") through which customers 6 can submit checks for deposit by financial institution 4. A "check" is a legal instrument that authorizes a financial institution to withdraw an amount of money from an account of a drafter of the check and deposit the amount of money in an account of the recipient of the check. Example checks include personal checks, money orders, cashier's checks, business checks, traveler's checks, government checks, and so on. As used in this disclosure, a "deposit transaction channel" is a channel through which a customer can submit a check for deposit.

Deposit transaction channels 8 may be a wide variety of deposit transaction channels. For example, deposit transaction channels 8 may include Automated Teller Machines (ATMs), human tellers at bank branches, remote deposit interfaces, lockboxes, armored car services, and other types of deposit transaction channels. As used in this disclosure, a remote deposit interface is an electronic interface through which a customer may submit an electronic version of a check for deposit by a financial institution. Furthermore, a "lockbox" is a post office box to which checks for a customer are mailed. A financial institution providing the lockbox is authorized to open all mail received in the lockbox and deposit in an account of the customer any check received in the lockbox. An armored car service is a service provided by a financial institution in which the financial institution sends an armored car to pick up checks from a customer's place of business and deposits all checks so received in the customer's account.

When financial institution 4 receives a check via a deposit transaction channel, the check is forwarded to a back office 10. Back office 10 represents an organization within financial institution 4 that is responsible for clearing checks received via deposit transaction channels 8. Back office 10 may be physically divided among many different geographic locations. Furthermore, back office 10 may not be a formal organization within financial institution 4, but may instead be a logical collection of those people and devices that are responsible for clearing checks received via deposit transaction channels 8.

When back office 10 receives a check, back office 10 applies a customizable set of business rules to identify a method of clearing the check from a plurality of available methods of clearing the check. After identifying a method of clearing the check, back office 10 may use the identified method to clear the check.

As illustrated in the example of FIG. 2, clearing methods 12A-12N (collectively, "clearing methods 12") are available for use by back office 10 to clear checks that draw on accounts held by financial institutions 14A-14N (collectively, "financial institutions 14"). Each of financial institutions 14, like financial institution 4, may be a bank, a financial services enterprise, a credit union, a mutual society, a savings and loan enterprise, a savings bank, an investment bank, or another type of financial institution.

Clearing methods 12 may include a wide variety of methods of clearing a check. For instance, clearing methods 12 may include an electronic check image exchange method, an Automated Clearing House (ACH) method, an on-us wholesale method, an on-us retail method, and other types of clearing methods.

In the paper exchange method, financial institution 4 physically sends a check to the one of financial institutions 14 that holds an account against which the check is drawn (i.e., the paying financial institution). Furthermore, in the paper exchange method, the paying financial institution inspects the check and, if the paying financial institution accepts the check, debits an amount specified by the check from the account against which the check is drawn. The paying financial institution may then notify financial institution 4 that the paying financial institution has accepted the check. When financial institution 4 receives this notification, financial institution 4 may credit the amount specified by the check to an account of the recipient of the check.

In the electronic check image exchange method, financial institution 4 creates digital images of the check. Financial institution 4 then sends the digital images of the check, along with associated metadata, to an electronic check image exchange service provider (not shown). One of financial institutions 14 may then automatically retrieve the digital images of the check from the electronic check image exchange service provider and process the check.

In an image replacement document print method, financial institution 4 creates digital images of the check. After creating the digital images of the check, financial institution 4 transmits the digital images of the check to one of financial institutions 14 that holds an account against which the check is drawn (i.e., the paying financial institution). The paying financial institution then uses the digital images of the check to print an image replacement document for the check. The image replacement document for the check effectively replaces the original copy of the check. After the paying financial institution prints the image replacement document, the paying financial institution processes the image replacement document as though the image replacement document was the original check.

In the ACH method, financial institution 4 creates an electronic version of the check. The electronic version of the check includes a digital image of a front side of the check, a digital image of a rear side of the check, and metadata that identifies the electronic version of the check. After financial institution 4 creates the electronic version of the check, financial institution 4 may securely submit the electronic version of the check to an ACH operator.

In the United States, there are two primary ACH operators: the governmental Federal Reserve System and the private Electronic Payments Network. Submissions to different ACH operators may be considered to be different clearing methods because different ACH operators may have different relative advantages and disadvantages. Regardless of which ACH operator receives the electronic version of the check, the ACH operator securely submits the electronic version of the check to the one of financial institutions 14 that holds an account against which the check is drawn (i.e., the payer financial institution). The payer financial institution may then inspect the electronic version of the check. If the payer financial institution accepts the electronic version of the check, the payer financial institution may send an acceptance notification to financial institution 4 via the ACH operator. Financial institution 4 may then credit an amount specified by the check to an account of the recipient of the check and the payer financial institution may debit the amount specified by the check from an account against which the check is drawn.

As mentioned above, back office 10 may automatically apply a customizable set of business rules to identify one of clearing methods 12 to use when clearing a check. The business rules may be formatted in a variety of ways. For example, each business rule in the customizable set of business rules may specify a condition expression and one of clearing methods 12. When the condition expression of a business rule is satisfied, and the priority of the business rule is higher than the priorities of all other business rules having conditions that are satisfied, back office 10 may identify the clearing method specified by the business rule. In another example, the business rules may be implemented as a neural network, an expert system, or a genetic algorithm that automatically learns which one of clearing methods 12 to identify under given conditions based on customizable feedback.

The business rules may be customized to serve a wide variety of purposes. For example, the business rules may be customized to include a business rule that indicates that a first one of clearing methods 12 is to be used when financial institution 4 receives a check during a first time period of a day and may indicate that a second one of clearing methods 12 is to be used when financial institution 4 receives the check during a second time period of the day. For instance, the business rule may indicate that the paper exchange method is to be used when financial institution 4 receives the check between 4:00 p.m. and 8:00 p.m. and may indicate that the ACH method is to be used when financial institution 4 receives the check at any other time of day. This business rule may be useful when 4:00 p.m. represents the latest time that financial institution 4 can use the ACH method and have the check clear that day. However, in this instance, the paper exchange method may still enable the check to be cleared on that day when financial institution 4 receives the check before 8:00 p.m. Note that in this example, the identified clearing method for the check is not dependent on the one of deposit transaction channels 6 through which financial institution 4 received the check.

In another example, the business rules may be customized to ensure that the identified clearing method is the one of clearing methods 12 that incurs the lowest cost to financial institution 4. In another example, the business rules may be customized to ensure that the identified clearing method is the one of clearing methods 12 that incurs the lowest cost to a customer who is the recipient of the check. In yet another example, the business rules may be customized to ensure that the identified clearing method is the one of clearing methods 12 that clears a check the fastest.

The business rules may be customized on a variety of different bases. For example, the business rules may be customized on customer-by-customer basis. In this example, the business rules may be customized such all checks received by customer 6A are cleared using the ACH method because this eases the accounting burden on customer 6A. In another example, the business rules may be customized based on account type. In this example, the business rules may be customized such that deposits to large business accounts are to be cleared using the fastest clearing method whereas deposits to small individual accounts are to be cleared using a least costly clearing method.

The business rules may be customized by a variety of different entities. In one example, the business rules may be customized by financial institution 4. In another example, financial institution 4 may provide, for each of customers 6, an interface that enables the customer to customize business rules that are specific to the customer. In this example, financial institution 4 may receive a request to customize the set of business rule from a customer via this interface and, in response to the request, customize the set of business rules in accordance with the request.

For example, in one embodiment, the financial institution 4 provides an online system. The customers 6 can log into the system and access a graphical user interface to modify the business rules that are applied. The graphical user interface can include a plurality of pre-set business rules, as well as one or more customized rules that can be selected by the customer 6.

In example embodiments, the back office 10 can include one or more computer systems. The computer systems can each include one or more a processing units and computer readable media. The computer readable media can include memory such as volatile (such as RAM), non-volatile (such as ROM, flash memory, etc.) or some combination thereof. The computer systems can include mass storage (removable and/or non-removable) such as a magnetic or optical disks or tape. An operating system and one or more application programs can be stored on the computer systems. For example, one or more applications running on the computer systems can be used to implement the business rules described herein. A plurality of input and output devices can be attached to the computer systems. Other configurations are possible.

Figure 3:
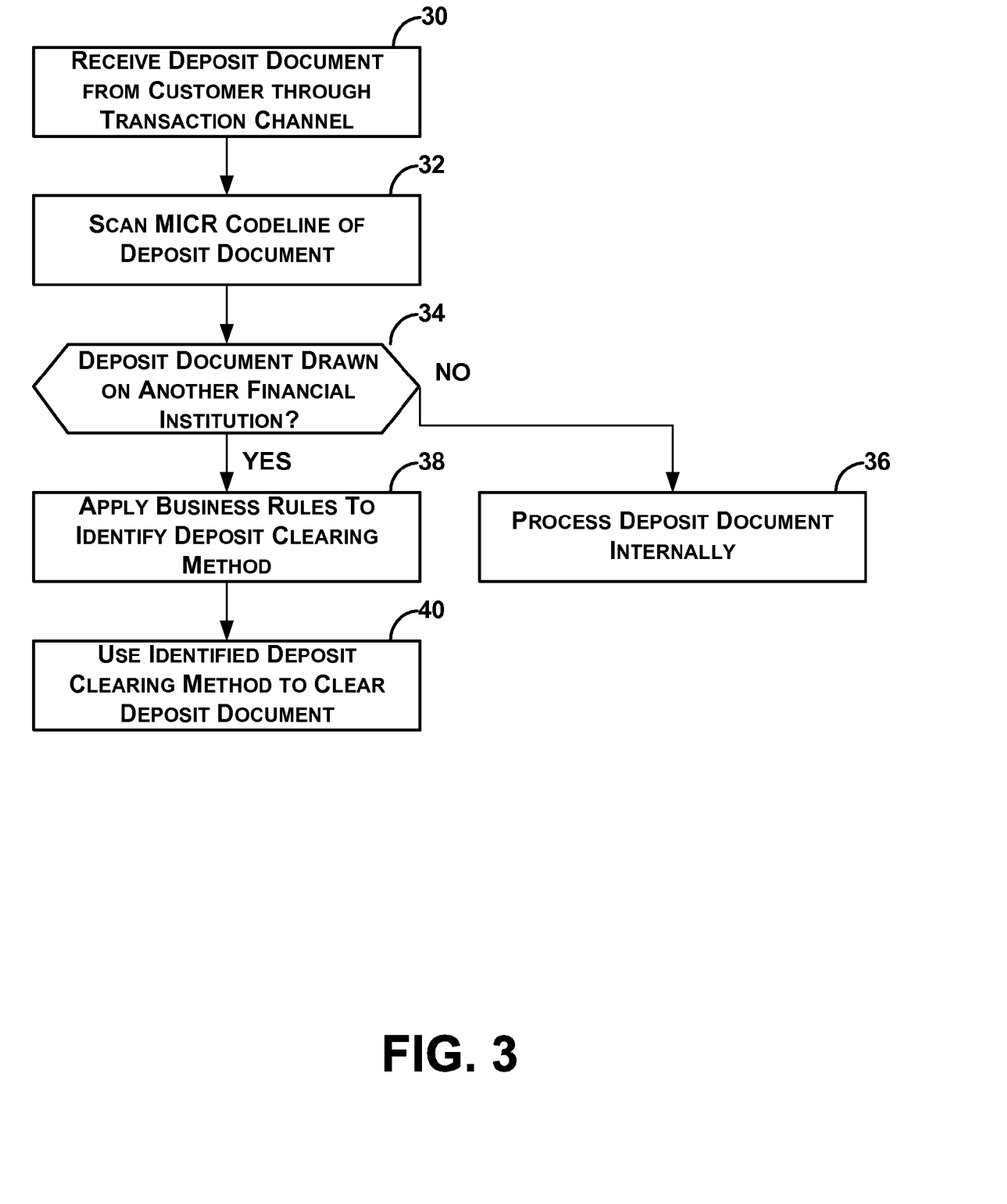
FIG. 3 is a flowchart illustrating a general operation of a back office illustrated in the system of FIG. 2.

FIG. 3 is a flowchart illustrating a general operation of back office 10 illustrated in the system of FIG. 2. FIG. 3 is provided for explanatory purposes only and is not intended to represent a sole operation that can be performed by back office 10.

Rather, back office 10 may perform many different operations without departing from the scope of the techniques of this disclosure.

In the example operation of FIG. 3, back office 10 initially receives a check from one of customers 6 (i.e., the "recipient customer") through one of deposit transaction channels 8 (30). For instance, back office 10 may receive a check from customer 6A through an ATM.

After receiving the check, back office 10 may scan the Magnetic Ink Character Recognition (MICR) codeline of the check (32). In general, the MICR codeline of a check is a computer-readable sequence of symbols that indicate a routing number of a financial institution (i.e., the payer financial institution) and an account number of an account held by the payer financial institution against which the check is drawn.

Back office 10 may then use the information in the MICR codeline of the check to determine whether the check is drawn against one of financial institutions 14 (34). For instance, back office 10 may determine that the check is drawn against one of financial institutions 14 when the MICR codeline of the check does not specify a routing number of a financial institution 4. If the check is not drawn against one of financial institutions 14 ("NO" of 34), back office 10 may process the check internally (36).

On the other hand, if the check is drawn against one of financial institutions 14 ("YES" of 34), back office 10 may apply the customizable set of business rules to identify one of clearing methods 12 to use when clearing the check (38). Back office 10 may then use the identified one of clearing methods 12 to clear the check (40).

The operations in the example of FIG. 3 are not the sole operations that can be performed by back office 10. For example, in some operations, back office 10 may, prior to applying the customizable set of business rules, determine whether the check is being deposited to an account held by a customer who has signed up for dynamic selection of deposit clearing methods based on business rules. If the customer has signed up for dynamic selection of deposit clearing methods based on business rules, the operation may proceed as in the example of FIG. 3. Otherwise, the check may be cleared using a default method.

Figure 4:
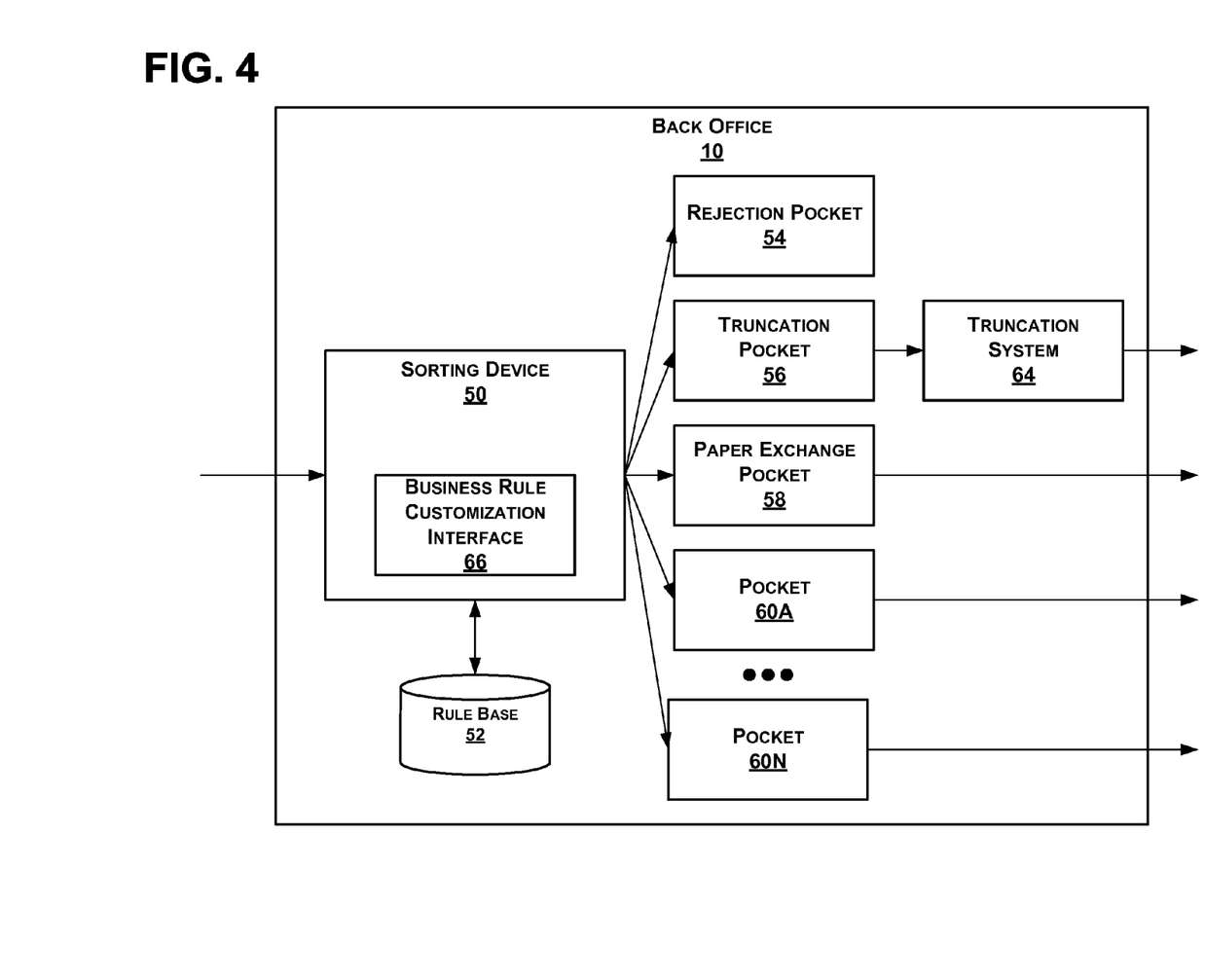
FIG. 4 is a block diagram illustrating example details of the back office illustrated in the example of FIG. 2.

FIG. 4 is a block diagram illustrating example details of back office 10. FIG. 4 is provided for explanatory purposes only and is not intended to represent a sole way for implementing back office 10. Rather, back office 10 may be implemented in a wide variety of ways.

In the example of FIG. 4, back office 10 includes a sorting device 50. Sorting 50 is a device that receives and sorts checks. Sorting device 50 may receive checks from deposit transaction channels 8. When sorting device 50 receives a check from one of deposit transaction channels 8, sorting device 50 may also receive an account number of a recipient of the check. Sorting device 50 may receive checks from different deposit transaction channels in different ways. For example, sorting device 50 may receive a check from a teller deposit transaction channel as a paper document. In another example, sorting device 50 may receive a check from a remote deposit transaction channel as an electronic version of a check.

After receiving a check, sorting device 50 may perform a variety of actions to extract information needed to determine how to sort the check. For example, when sorting a paper check, sorting device 50 may first scan a MICR codeline of the check to identify a payer financial institution and a payer account number. In this example, the payer financial institution and the payer account number may be needed to determine how to sort the check. In another example, sorting device 50 may identify the time of day, the account type of the recipient customer, or any other type information that is specified in a condition of a business rule.

Once sorting device 50 has extracted the information needed to determine how to sort the check, sorting device 50 may automatically use the information to apply the set of business rules to identify a method of clearing the check. In the example of FIG. 4, the business rules are stored in a rule base 52. Rule base 52 may be a database, a file system, or another data storage medium.

After sorting device 50 identifies a method of clearing the check, sorting device 50 may forward the check to a pocket associated with the identified method. As used in this disclosure, a "pocket" is a medium for temporarily storing a document. For instance, a pocket may be a bin that temporarily stores paper checks. In another instance, a pocket may be a data storage medium such as a hard disk that temporarily stores an electronic check.

As illustrated in the example of FIG. 4, back office 10 includes a rejection pocket 54, a truncation pocket 56, and a paper exchange pocket 58.

Sorting device 50 may sort a check into rejection pocket 54 when sorting device 50 determines that none of clearing methods 12 would be able to clear the check. For instance, when a check is torn or critical information on the check is obscured, none of clearing methods 12 would be able to clear the check. After sorting device 50 sorts a check into rejection pocket 54, machines or people in back office 10 may attempt to repair the check or else return the check to the recipient of the check.

Sorting device 50 may sort a check into truncation pocket 56 when sorting device 50 determines that an ACH method is to be used to clear the check. When a check is sorted into truncation pocket 56, a truncation system 64 automatically generates an electronic version of the check. The process of generating an electronic version of a check is referred to as "truncation" because the physical paper of the check is truncated from the check, leaving only the information stored on the check. After truncation system 64 generates the electronic version of the check, truncation system 64 may automatically submit the electronic version of the check to an ACH operator, thereby initiating the ACH method of clearing the check.

Sorting device 50 may sort a check into paper exchange pocket 56 when sorting device 50 determines that a paper exchange method is to be used to clear the check. When a check is sorted into paper exchange pocket 58, the check is subsequently exchanged with a payer financial institution or a financial institution acting on behalf of the payer financial institution.

As illustrated in the example of FIG. 4, back office 10 also includes additional pockets 60A-60N (collectively, "pockets 60"). Each of pockets 60 may be associated with a different method of clearing financial documents. For instance, sorting device 50 may sort a check into pocket 60A when sorting device 50 determines that an electronic check image exchange method for clearing checks is to be used to clear the check. In another instance, sorting device 50 may sort a check into pocket 60B when sorting device 50 determines that an image replacement document print method is to be used to clear the check.

Furthermore, as illustrated in the example of FIG. 4, sorting device 50 may provide a business rule customization interface 66. Business rule customization interface 66 may be a wide variety of different types of interfaces. For example, business rule customization interface 66 may be a command line interface, a web interface, a touch screen interface, a button array integrated into sorting device 50, an application programming interface, or another type of interface. A user may use business rule customization interface 66 to customize the business rules in rule base 52. A variety of different types of users can use business rule customization interface 66. For instance, types of users that can use business rule customization interface 66 may include employees of financial institution 4, customers 6, employees of a third party that operates back office 10, and other types of users.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a computer-readable medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable media and executed by processors. The memory unit may be implemented within the processor or external to the processor, in which case it can be communicatively coupled to the processor via various means as is known in the art.

Various implementations have been described. These and other implementations are within the scope of the following claims.

What is claimed is:

1. A method for choosing how to clear checks received by a financial institution, the method comprising:
   receiving, by the financial institution, a first check and a second check, the first check and the second check deposited at the financial institution through a same deposit transaction channel;
   after the financial institution receives the first check, applying, by a computer system, a set of business rules to identify a first check clearing method as an advantageous method for clearing the first check, wherein clearing the first check includes withdrawing a first amount of money from an account of a drafter of the first check and depositing the first amount of money in an account of a recipient of the first check, the recipient of the first check being a customer of the financial institution;
   after the financial institution receives the second check, applying the same set of business rules to identify a second check clearing method as an advantageous method for clearing the second check, the first check clearing method and the second check clearing method comprising different ones of the following check clearing methods: an automated clearing house (ACH) method, an electronic check image exchange method, a paper exchange method, and an image replacement document print method, wherein clearing the second check includes withdrawing a second amount of money from an account of a drafter of the second check and depositing the second amount of money in an account of a recipient of the second check, the recipient of the second check being a customer of the financial institution;
   after identifying the first check clearing method as the advantageous method for clearing the first check, using, by the financial institution, the first check clearing method to clear the first check; and
   after identifying the second check clearing method as the advantageous method for clearing the second check, using, by the financial institution, the second check clearing method to clear the second check.

2. The method of claim 1, further comprising, prior to receiving the first check and the second check, customizing the set of business rules.

3. The method of claim 2, wherein customizing the set of business rules further comprises customizing the set of business rules to include a business rule that indicates that the first check clearing method is to be used to clear checks received by the financial institution during a first time period during a day and indicates that the second check clearing method is to be used to clear checks received by the financial institution during a second time period during the day.

4. The method of claim 2, wherein customizing the set of business rules further comprises customizing the set of business rules to include a business rule that specifies that the first check clearing method is to be used to clear checks regardless of the transaction channel through which the financial institution receives the checks.

5. The method of claim 2, wherein customizing the set of business rules further comprises customizing the set of business rules to include business rules to select a clear clearing method that has a lower cost to the financial institution.

6. The method of claim 2, wherein customizing the set of business rules further comprises customizing the set of business rules to include business rules to select a check clearing method that has a lower cost to the customer.

7. The method of claim 2, wherein customizing the set of business rules further comprises customizing the set of business rules to select a faster check clearing method.

8. The method of claim 2, wherein customizing the set of business rules comprises:
   receiving a request to customize the set of business rules from the customer; and
   customizing the set of business rules in accordance with the request.

9. The method of claim 1, wherein applying the set of business rules to identify the first check clearing method as the advantageous method for clearing the first check comprises automatically sorting the first check into a pocket associated with the first check clearing method.

10. The method of claim 1, wherein the transaction channel is in a group of transaction channels consisting of: a branch office, an automated teller machine (ATM), a remote deposit service, a lockbox service, and an armored car service.

11. A system for choosing how to clear checks received by a financial institution, the system comprising:
   a plurality of deposit transaction channels that receive the checks from customers of the financial institution, the checks including a first check and a second check, the first check and the second check deposited through a same one of the deposit transaction channels;
   a first pocket and a second pocket the first pocket associated with a first check clearing method, the second pocket associated with a second check clearing method, wherein clearing a check includes withdrawing an amount of money from an account of a drafter of the check and depositing the amount of money in an account of a recipient of the check; and a sorting device that:
  applies a customizable set of business rules to identify the first check clearing method as an advantageous method for clearing the first check;
  applies the customizable set of business rules to identify the second check clearing method as an advantageous method for clearing the second check, wherein the first check clearing method and the second check clearing method comprise different ones of the following check clearing methods: an automated clearing house (ACH) method, an electronic check image exchange method, a paper exchange method, and an image replacement document print method;
  sorts the first check into the first pocket: and
  sorts the second check into the second pocket.

12. The system of claim 11, further comprising a business rule customization interface that receives input from a user to customize the set of business rules.

13. The system of claim 11, wherein the deposit transaction channels include: a branch office, an automated teller machine (ATM), a remote deposit service, a lockbox service, and an armored car service.

14. A non-transitory computer-readable medium comprising instructions that cause a device that executes the instructions to:
  provide an interface that receives input from a user to customize a set of business rules to include a business rule that indicates that a first method of clearing checks is to be used when a financial institution receives checks during a first time period during a day and indicates that a second method of clearing checks is to be used when the financial institution receives the checks during a second time period during the day;
  receive, at the financial institution, a check from a customer through a transaction channel, wherein the transaction channel selected from a group of transaction channels including: a branch office, an automated teller machine (ATM), a remote deposit service, a lockbox service, and an armored car service;
  after receiving the check, apply the set of business rules to identify a method of clearing the check from a plurality of available methods of clearing the check, wherein clearing the check includes withdrawing an amount of money from an account of a drafter of the check and depositing the amount of money in an account of a recipient of the check, wherein each of the available methods of clearing the check clears the check in a different way, wherein the available methods of clearing the check include an automated clearing house (ACH) method, an electronic check image exchange method, and an image replacement document print method; and
  after applying the set of business rules, sort the check into a pocket associated with the identified method of clearing the check.

15. The non-transitory computer readable medium of claim 14, wherein the interface receives input from the user to customize the set of business rules to include business rules to select a check clearing method that has a lower cost to the financial institution.

16. The non-transitory computer readable medium of claim 14, wherein the interface receives input from the user to customize the set of business rules to include business rules to select a check clearing method that has a lower cost to the customer.

17. The non-transitory computer readable medium of claim 14, wherein the interface receives input from the user to customize the set of business rules to select a faster check clearing method.

* * * * *